United States Patent
Nagasaki

(10) Patent No.: US 6,424,767 B2
(45) Date of Patent: Jul. 23, 2002

(54) METHOD FOR PRODUCTING AN OPTICAL FIBER CORD AND AN OPTICAL FIBER TAPE CORD

(75) Inventor: Hironobu Nagasaki, Tokyo (JP)

(73) Assignee: Nissho Musen Co., Ltd., Tokyo (JP); (Assignee in part)

( * ) Notice: Subject to any disclaimer, the term of this patent is extended or adjusted under 35 U.S.C. 154(b) by 0 days.

(21) Appl. No.: 09/794,348

(22) Filed: Feb. 28, 2001

(30) Foreign Application Priority Data

Mar. 13, 2000 (JP) ........................................ 2000-068863

(51) Int. Cl.$^7$ .............................................. G02B 27/00
(52) U.S. Cl. ........................................................ 385/100
(58) Field of Search .................................. 385/100, 104, 385/108, 111, 113; 65/409, 412; 29/845, 862

(56) References Cited

U.S. PATENT DOCUMENTS 4,279,470 A * 7/1981 Portinari et al. ............ 385/111
5,674,306 A * 10/1997 Hoshino et al. .............. 65/385
6,055,350 A * 4/2000 Brown et al. ................ 385/100

\* cited by examiner

Primary Examiner—Brian Sircus
Assistant Examiner—Michael C. Zarroli
(74) Attorney, Agent, or Firm—Israel Gopstein

(57) ABSTRACT

A method for producing an optical fiber cord or an optical fiber cord tape, making it possible to produce optical fiber cords or optical fiber tape cords of large or small bores in a highly efficient manner, comprises the steps of placing a replaceable line 2 at the center, arranging resilient fibers 3 around its periphery, and covering the assembly with a jacket 4, to produce a dummy cord 1; exposing, at both ends of dummy cord 1, the ends of replaceable line 2 and of resilient fibers 3 from the ends of jacket 4; connecting one exposed end of replaceable line 2 with an optical fiber core line 5 or a unit core line 7 of an optical fiber tape cord; and replacing the replaceable line 2 in dummy cord 1 with the optical core line 5 or unit core line 7.

1 Claim, 4 Drawing Sheets

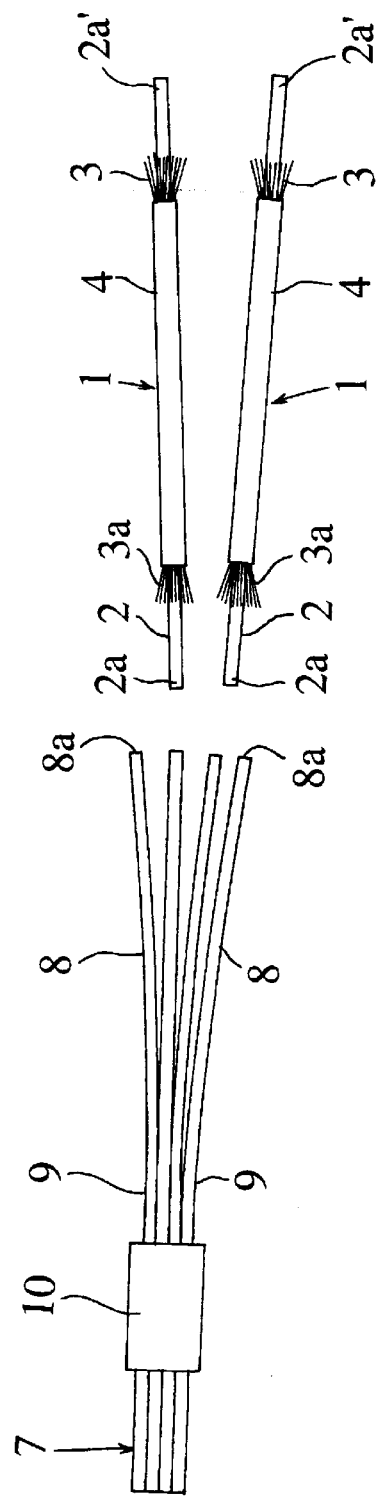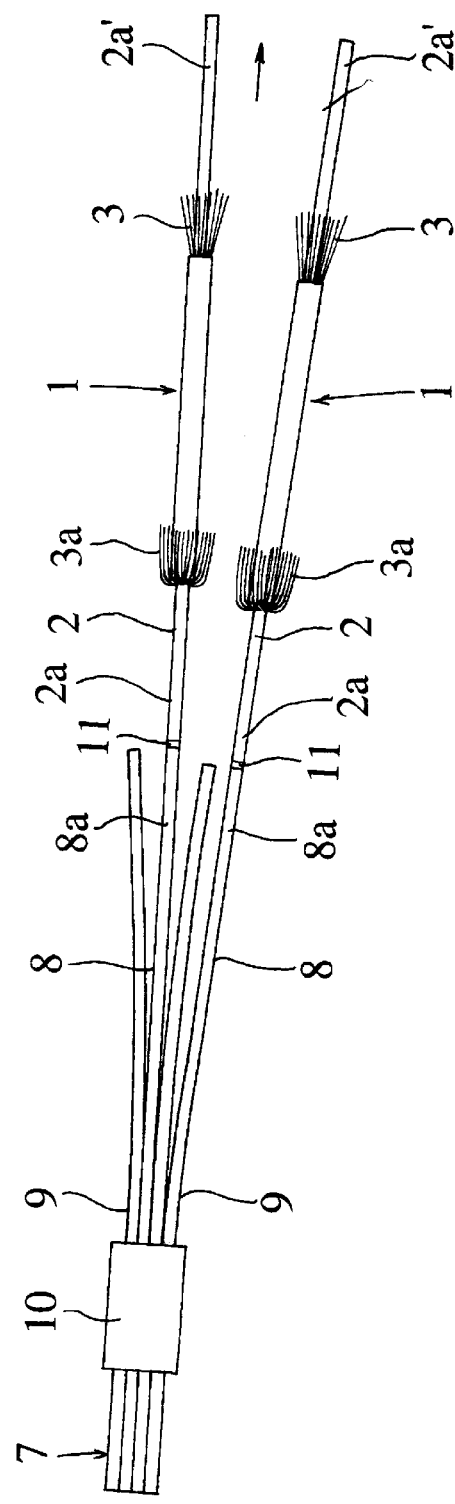

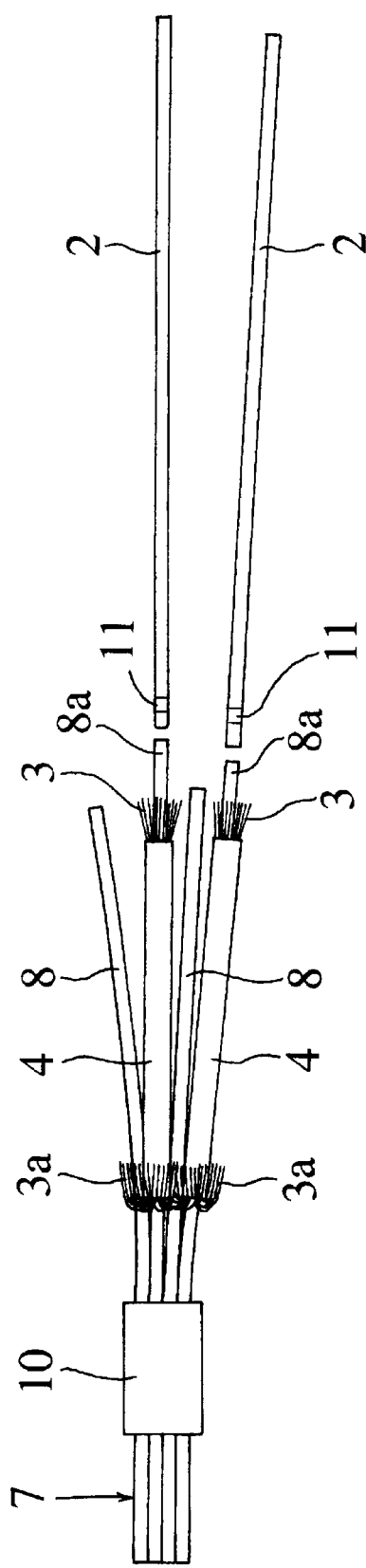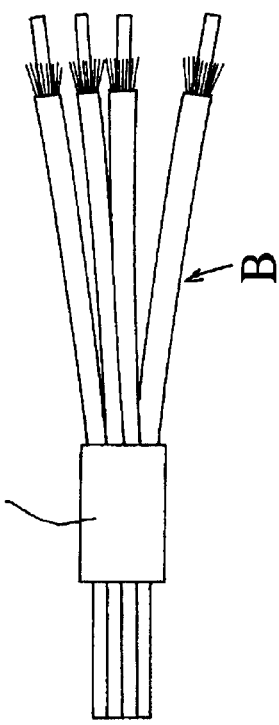

METHOD FOR PRODUCING AN OPTICAL FIBER CORD AND AN OPTICAL FIBER TAPE CORD

BACKGROUND OF THE INVENTION

1. Field of the Invention

The present invention relates to a method for producing an optical fiber cord and an optical fiber tape cord, particularly to a method for producing a small-bore optical fiber cord and optical fiber tape cord useful for the manufacture of a highly dense, optics-related apparatus and its components.

2. Prior Art

Conventionally, an optical fiber cord is obtained by applying a resin coat over an optical fiber element line to turn it into an optical fiber core line, and then applying around the periphery of the optical fiber core line a PVC coat with resilient fibers such as aramid fiber, glass fiber, copper wire, PBO fiber, etc., intervened in between.

The optical fiber cord having the constitution as described above is produced as follows.

Firstly, a nylon tube (a) having a bore of a desired size is prepared as shown in FIG. 3(A), and resilient fibers (b) as described above are arranged longitudinally around the periphery of the nylon tube (a). Next, the nylon tube (a) having the resilient fibers (b) arranged around its periphery is inserted into a tubular PVC cover (c) as shown in FIG. 3(B). Then, an optical fiber element line (d) is inserted into the nylon tube (a) to produce thereby an optical fiber core line (e) as shown in FIG. 3(C), and the whole assembly is made an optical fiber cord A.

However, with the conventional method, all procedures necessary for the production of an optical fiber cord are practiced manually. Therefore, while it is comparatively easy to produce an optical fiber cord having a large bore size, production of a small bore fiber cord requires extra labor and time for completion because then it is often difficult to pass a nylon tube with resilient fibers arranged longitudinally around its periphery smoothly through a tubular PVC cover having a comparatively small size Accordingly, development of a method whereby it is possible to efficiently produce a small-bore optical fiber cord or small-bore optical fiber cord tape is urgently demanded, because nowadays optics-related apparatuses and their components are increasingly more compacted and densely packed.

SUMMARY OF THE INVENTION

This invention was derived from an attempt to meet such a demand arisen with respect to the problem inherent to the conventional method, and aims at providing a method for producing an optical fiber cord or an optical fiber cord tape which consists of preparing a dummy cord incorporating a replaceable line and resilient fibers, connecting the replaceable line of the dummy cord with an optical fiber core line, and replacing the replaceable line with the optical fiber core line, thereby making it possible to efficiently produce an optical fiber cord and optical fiber tape cord whether their bore is large or small, without degrading the quality of the cord product whatsoever.

The method according to this invention for producing an optical fiber cord and an optical fiber cord tape comprises preparing a dummy cord by placing a replaceable line at the center, arranging resilient fibers around the periphery of the replaceable line, and covering the assembly with a jacket; exposing both ends of the replaceable line and of resilient fibers from the jacket of the dummy cord; connecting one end of the replaceable line with an optical fiber core line or a unit core line of an optical fiber cord tape; and replacing the replaceable line with the optical core line or the unit core line.

BRIEF DESCRIPTION OF THE DRAWINGS

FIGS. 2(A), 2(B), 2(C) and 2(D) are the longitudinal sections of an optical fiber tape cord to illustrate the production processes observed in another embodiment of this invention.

DESCRIPTION OF THE PREFERRED EMBODIMENTS

Figure 1A:
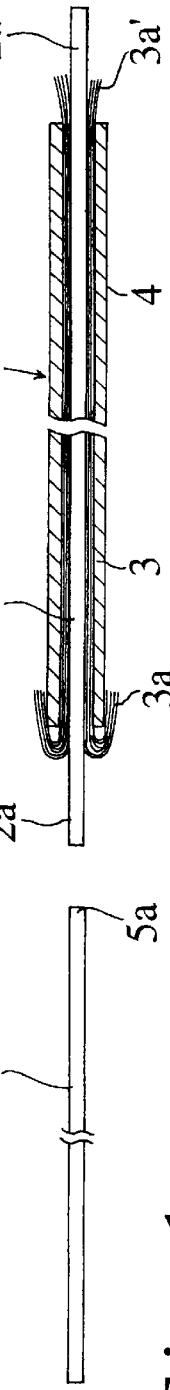
FIGS. 1(A), 1(B), 1(C) and 1(D) are the longitudinal sections of an optical fiber cord to illustrate the production processes observed in an embodiment of this invention.

The preferred embodiments of this invention will be described below with reference to accompanying figures.

FIGS. 1(A), 1(B), 1(C) and 1(D) are the longitudinal sections of an optical fiber cord partially disintegrated to illustrate the production processes observed in an embodiment of this invention, while FIGS. 2(A), 2(B), 2(C) and 2(D) are the longitudinal sections of an optical fiber tape cord partially disintegrated to illustrate the production processes observed in another embodiment of this invention.

Firstly, the processes for producing an optical fiber cord as illustrated in FIG. 1 will be described.

A dummy cord is represented by a numeral 1 in FIG. 1. The dummy cord 1 is configured as follows: a replaceable line 2 is placed at the center; the replaceable line 2 has resilient fibers 3 arranged around its periphery; and the whole assembly is covered with a jacket 4.

The replaceable line 2 may be made of any material such as an optical fiber core line, electroconductive wire, piano wire, copper wire, nylon thread, vinylon thread, etc., as long as it is sufficiently resilient and has a smooth surface.

The resilient fiber 3 is preferably made of light fibers having a diameter of 20–50 μm such as aramid fiber, glass fiber, copper wire, PBO fiber, etc., but may be made of fibers other than above.

The jacket 4 is preferably made of a thermoplastic resin, thermosetting resin, UV hardening resin, etc. which has been used for the outer covering of a conventional optical fiber cord.

An equal length of jacket 4 is removed from each end of the dummy cord 1; a considerably long end of replaceable line 2 with resilient fibers 3 disposed around it is exposed from each cut end of jacket 4; and the ends 2a and 2a' of replaceable line 2 and the ends 3a and 3a' of resilient fibers 3 each having specified lengths with respect to the cut ends of jacket 4 are prepared on both ends of dummy cord 1.

An optical fiber core line is represented by a numeral 5 in FIG. 5. It has a diameter substantially the same with that of the replaceable line 2 within dummy cord 1.

Figure 1B:
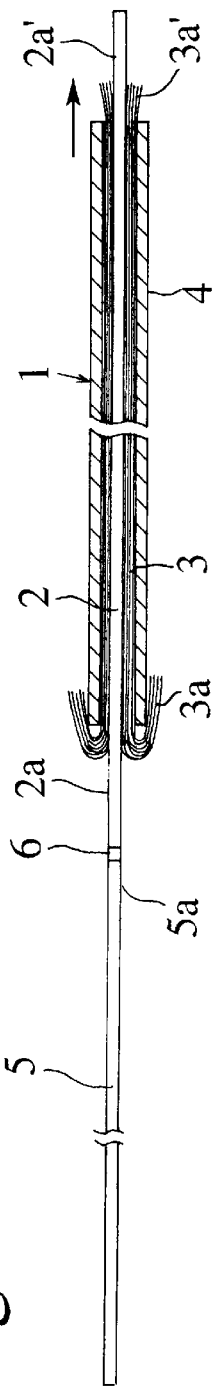
Figure 1C:
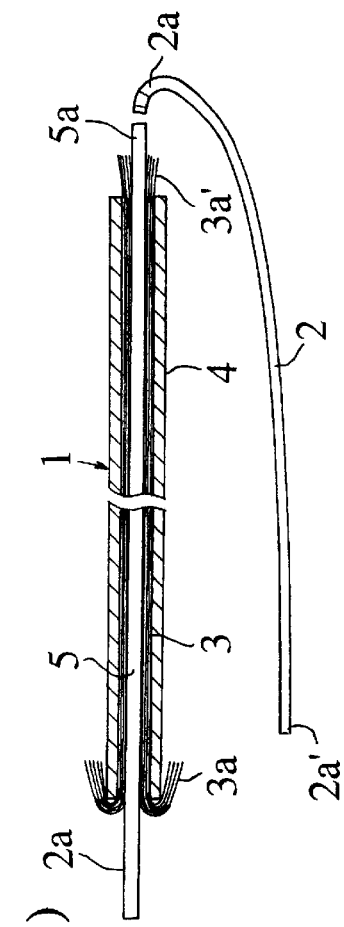
Figure 1D:
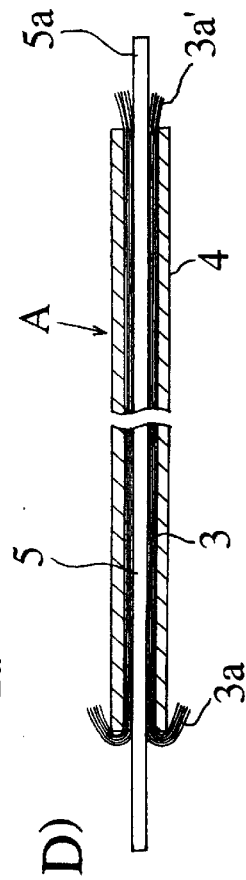
Figure 3A:
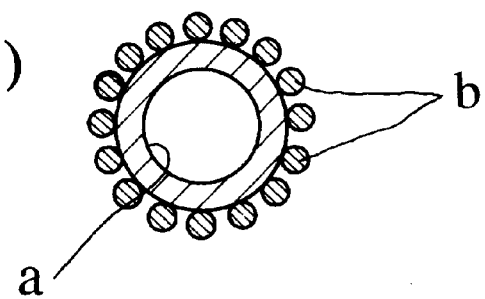
FIG. 3 shows the cross-sections of an optical fiber cord to illustrate the production processes of a conventional method.
Figure 3B:
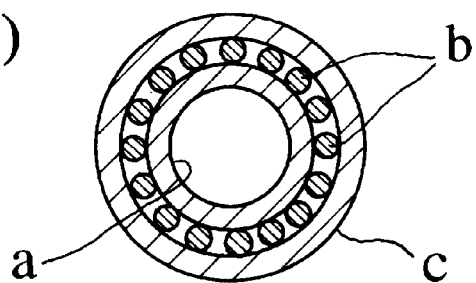
Figure 3C:
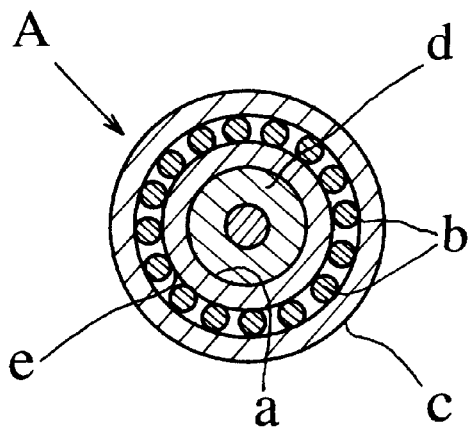

One end 5a of optical fiber core line 5 is placed opposite to one end 2a of the replaceable line 2 of dummy cord 1 as shown in FIG. 1(A); the two ends 2a and 5a are connected by fusion as shown in FIG. 1(B); and the opposite end 2a' of replaceable line 2 is pulled towards the direction (rightward) as indicated by the arrow of the figure. Then, the replaceable line 2 slides through the interior of jacket 4 until it is expelled out of jacket 4; at this time the optical fiber core line 5 has been inserted into jacket 4 to replace the replaceable line 2 as shown in FIG. 1(C). The end 5a of optical fiber core line 5 is separated from the replaceable line 2 by cutting; and then an optical fiber cord A is obtained as shown in FIG. 1(D).

The fusion-connected section between the end 2a of replaceable line 2 and the end 5a of optical fiber core line 5 is represented by a numeral 6 in FIG. 1(B). The connection may be achieved by adhesion based on an instantaneous adhesive instead of fusion. When the replaceable line 2 is completely replaced with the optical fiber core line 5, the replaceable line 2 is preferably cut off close to the connection section towards the cut-end of jacket 4 as shown in FIG. 1(C). The ends 3a of resilient fibers 3 are preferably folded back towards the cut-end of jacket 4 as shown in the figures, to facilitate the replacement of replaceable line 2 with optical fiber core line 5.

Next, the production processes of an optical fiber tape cord in another embodiment as shown in FIG. 2 will be described.

Cords accompanied with a numeral 1 in FIG. 2 represent dummy cords. Each of those dummy cords 1 has the same configuration as does the dummy cord of FIG. 1: a replaceable line 2 is placed at the center; the replaceable line 2 has resilient fibers 3 arranged around its periphery; and the whole assembly is covered with a jacket 4.

In this embodiment, however, a plurality of dummy cords 1 (four in this particular embodiment) are prepared as desired to form an optical fiber tape cord.

An optical fiber tape cord is represented by a numeral 7 in FIG. 2; and it is divided midway into individual unit core lines 8 (four in this particular embodiment). The unit core line 8 has an external diameter substantially the same with that of a replaceable line 2 passing through a dummy cord 1. The numeral 9 in the figures represents the division section of the optical fiber tape cord 7, while the numeral 10 represents a sheath movably placed over the optical fiber tape cord 7.

One end 2a of each replaceable line 2 passing through the dummy cord 1 is placed opposite to an end 8a of each unit core line 8 constituting the optical fiber tape cord 7 as shown in FIG. 2(A); and the two ends 2a and 8a are connected by fusion as shown in FIG. 2(B). This operation is repeated for all the pairs of replaceable lines 2 and unit core lines 8. The opposite ends 2a' of the thus connected replaceable lines 8 are pulled towards the direction (rightward) as shown by the arrow in the figure; and the replaceable lines 2 slide through jackets 4 until they are expelled out of the jackets 4. At this instant, the replaceable lines 8 previously in the jackets 4 have been completely replaced with the connected unit core lines 8. The ends 8a of unit core lines 8 are separated by cutting; and then an optical fiber tape cord B is obtained as shown in FIG. 2(D).

The fusion-connected sections between the ends 2a of replaceable lines 2 and the ends 8a of unit core lines 8 are represented by numerals 11 in the figures. The connection may be achieved by adhesion based on an instantaneous adhesive instead of fusion as in the above embodiment. When the replaceable lines 2 are completely replaced with the unit core lines 8, the former are preferably cut close to the connection sections towards the cut-ends of jackets 4 as shown in FIG. 2(C) similarly to the above embodiment. The ends 3a of resilient fibers 3 are preferably folded back towards the cut-ends of jackets 4 as shown in the figures, similarly to the above embodiment.

Then, the sheath 10 placed over the optical fiber tape cord 7 is moved to the division section 9 such that it contains, in its extra cavity, the folded-back ends 3a of resilient fibers 3 which are then fixed in that cavity with a bonding agent not illustrated here. The fixation may be achieved by a mechanical means such as clamping, pressure bonding, etc., instead of bonding based on a bonding agent.

The method of this invention is put into practice as described above. Briefly, a dummy cord containing a replaceable line at its center with resilient fibers around the line is prepared; the replaceable line of dummy cord is connected with an optical fiber core line, or with a unit core line of an optical fiber tape cord; and the end of replaceable line opposite to the connected there of end is pulled until the replaceable line cord is completely withdrawn from the dummy cord, and replaced with the optical fiber core line or the unit core line. According to this method, even if it is applied for the manufacture of a small-bore optical fiber cord or a small-bore optical fiber tape cord (including a branched cord), not to mention a large-bore optical fiber cord or a large-bore optical fiber tape cord, it is possible to easily and rapidly produce the cord or tape without causing any displacements or distortions of resilient fibers in a narrow space between the core line and the jacket. Thus, mass production of optical fiber cords and optical tape cords by the method of this invention will be greatly improved in its efficiency.

What is claimed is:

1. A method for producing an optical fiber cord or an optical fiber tape cord comprising the steps of:

placing a replaceable line at the center, and covering the line with a jacket and resilient fibers disposed around a periphery of the line, to produce a dummy cord;

exposing, at both ends of the dummy cord, the ends of replaceable line and resilient fibers from the ends of jacket;

connecting one exposed end of replaceable line with an optical fiber core line or with a unit core line of an optical fiber tape cord; and replacing the replaceable line in the dummy cord with the optical core line or with the unit core line.

* * * * *

UNITED STATES PATENT AND TRADEMARK OFFICE
CERTIFICATE OF CORRECTION

PATENT NO.    : 6,424,767 B2
DATED         : July 23, 2002
INVENTOR(S)   : Hironobu Nagasaki It is certified that error appears in the above-identified patent and that said Letters Patent is hereby corrected as shown below:

<u>Title page,</u>
Item [54], Title should read -- METHOD FOR PRODUCING AN OPTICAL FIBER CORD AND AN OPTICAL FIBER TAPE CORD --

Signed and Sealed this

Seventeenth Day of September, 2002

*Attest:*

*Attesting Officer*

JAMES E. ROGAN
*Director of the United States Patent and Trademark Office*